United States Patent [19]
Pirkle

[11] Patent Number: 6,080,218
[45] Date of Patent: Jun. 27, 2000

[54] SMOG SCOOP WITH DISPOSABLE FILTER INSIDE

[76] Inventor: Stephen Pirkle, 2725 E. Escusa Rd., Phoenix, Ariz. 85024

[21] Appl. No.: 08/985,923

[22] Filed: Dec. 5, 1997

[51] Int. Cl.[7] .............................. B01D 35/30; B01D 39/14
[52] U.S. Cl. .............................................. 55/385.3; 55/490
[58] Field of Search ................................ 55/385.3, 385.1, 55/490, 495, 521, 418, 378, 379, 385.6, 361; 454/156, 158

[56] References Cited

U.S. PATENT DOCUMENTS

| | | | |
|---|---|---|---|
| 4,743,279 | 5/1988 | Kvist et al. | 55/385.3 |
| 4,748,451 | 5/1988 | Edwards | 343/880 |
| 5,192,345 | 3/1993 | Pala | 96/267 |
| 5,261,791 | 11/1993 | Goguen | 417/2 |
| 5,291,707 | 3/1994 | McDonald | 52/244 |
| 5,358,442 | 10/1994 | Ekinci | 55/385.3 |
| 5,426,887 | 6/1995 | Spencer | 47/21 |

FOREIGN PATENT DOCUMENTS 2218354  11/1989  United Kingdom .................. 55/385.3

Primary Examiner—David A. Simmons
Assistant Examiner—Robert A. Hopkins

[57] ABSTRACT

A smog scoop (10) comprises a funnel (12) which comprises a large diameter funnel ingress (12A) connected to a small diameter funnel egress (12B) by a tapering funnel middle (12C). The smog scoop (10) further comprise a connector (14) securely attached at an outer distal end to the funnel ingress (12A). The connector (14) is surely attached to a holder (16). The holder (16) is securely attached to an inner distal end of the connector (14). The holder (16) is mounted on a vehicle antenna (20A) of a vehicle (20). The smog scoop (10) still further comprises a disposable filter (18) mounted within the funnel (12) functioning to remove pollutants fom air.

14 Claims, 5 Drawing Sheets

1

SMOG SCOOP WITH DISPOSABLE FILTER INSIDE

BACKGROUND OF THE INVENTION

1. Field of the Invention

The present invention relates to pollution control. More particularly, the present invention relates to devices to clean the atmosphere.

2. Description of the Prior Art

Vehicles are known to pollute the atmosphere through exhaust emissions. Numerous inventions have been developed to eliminate the pollutants from reaching the atmosphere, but little is done to clean the existing atmosphere. If each driver of the millions of vehicles could recover some of the pollutants there would be a major impact in reducing the over all pollution levels. What is needed is a device that is installed on each vehicle that recovers some of the pollution which enters the atmosphere.

In U.S. Pat. No. 5,426,887, titled Shelter Cone for Protecting Seeds and Seedlings, invented by Henry A. Spencer, and Stephen W. J. Dominy, an improved, light-transmitting, plastic shelter cone or terrarium is provided for the germination of seed and growth of seedlings. The cone has a lower soil-engaging flange at its base and a vent opening at its top. The vent opening is covered with a hinged flap which is an integral part of the cone and to which seed may be secured using a water soluble adhesive. When placed in the field, the flap is pressed down into engagement with sidewall indentations which hold the flap and seed in a generally vertical orientation within the cone chamber. Stiffening ribs are formed in the cone wall, protruding outwardly and forming grooves within. Seed may be secured within a groove with water soluble adhesive. When the cone is used, rainfall will dissolve the adhesive, whereby the seed may drop to the soil below. Latching the flap ensures that it does not return to block the vent opening. Preferably, the plastic is sunlight degradable and is further colored translucent red to modify the transmitted light.

The patented invention differs from the present invention because the patented invention is a device for protecting seedings from the environment while germinating. The patented invention lacks features similar to the present invention In U.S. Pat. No. 5,291,707, titled Bird Protector for Exhaust Stack, invented by Dixie N. McDonald, describes a bird protector apparatus for attachment to the outlet end of a flue gas stack that emits flue gases into the atmosphere. The stack has a concentrically arranged outer annular member spaced from the inner stack for flow of gas therebetween. The protector apparatus prevents birds from alighting on the end of the stack as well as on the protector itself. The protector apparatus comprises a conical wire mesh screen of a size to preclude birds traveling therethrough and to freely allow flue gases to flow therethrough, and has a lower end opposed to an apex. A clamp attaches the lower end of the wire cone to the upper end of the stack, with the apex being axially aligned with the centerline of the stack. An apparatus can be included on the exterior of the wire cone to frighten birds from perching on the apex.

The patented invention differs from the present invention because the patented invention is a bird protector apparatus for attachment to the outlet end of a flue gas stack. The patented invention keeps birds from falling down the exhaust stack. The patented invention lacks features similar to the present invention.

In U.S. Pat. No. 5,261,791, titlded Method and Apparatus for Recovering Pollutants from an Aquifer, Robin A. Goguen, a pumping apparatus is described for recovering a first liquid, such as a pollutant, floating on a second liquid, such as ground water. A pump immersed in the second liquid, or ground water, operates to produce a cone of depression and discharge the second liquid into a pressure vessel. A variable volume chamber inside the pressure vessel contracts and displaces any contents through an outlet conduit to a product discharge point. When the pump turns of the variable volume chamber expands and draws product into the chamber to be driven from the chamber during successive pumping operations. Over time periodic pumping operations cause the variable volume chamber to recover the first liquid and move it to a discharge point.

The patented invention differs from the present invention because the patented invention is a pumping apparatus for recovering a pollutant, floating on ground water. The patented invention lacks features similar to the present invention In U.S. Pat. No. 5,192,345, titled System and Process for the Purification Treatment of Smokes, Dusts and Exhaust Gases, invented by Luca Pala, the system according to the present invention comprises a hood or a cone provided above smokestacks, industrial chimneys, flues and nearby exhaust-pipes, for leading smokes, dusts and gases, by means of a suction fan, into a serpentine duct provided with a series of nozzles for the nebulization of water under pressure coming from a pump or a compressor, and that will reduce pollution firstly into smog and then into sewage, while the purified air and/or vapor get out through a filter-grate.

The patented invention differs from the present invention because the patented invention is a device that will change air pollution into smog and then into sewage. The patented invention lacks features similar to the present invention.

In U.S. Pat. No. 4,748,451, titled Adjustable Bracket Mount, invented by Ivan J. Edwards, an adjustable bracket mount for mounting certain functional components such as a feed horn and a low noise amplifier feed assembly on a satellite antenna dish at the prime focus or other desired location above the antenna dish, which mount includes a base secured to the dish, a bottom support extending from the base toward the prime focus, a sloped offset bracket having one end provided in adjustable cooperation with the bottom support and the opposite end carrying a top support The top support extends in parallel relationship to the bottom support and projects above the bottom support and a top bracket is adjustably mounted on the top support and features outwardly-extending arms designed to carry the feed assembly and mount a cover. Two variations of the top bracket are employed and a cone-shaped cover is provided to protect the feed assembly from the elements by mounting on both versions of the top bracket.

The patented invention differs from the present invention because the patented invention is an adjustable bracket mount. The patented invention lacks features similar to the present invention.

The above patented inventions differ from the present invention because they fail to describe or claim at least one combination of the following features depicted in the present invention a filter attachable to a vehicle radio antenna with a scoop portion to direct air flow onto a filter.

Numerous innovations for smog scoop have been provided in the prior art that are adapted to be used. Even though these innovations may be suitable for the specific individual purposes to which they address, they would not be suitable for the purposes of the present invention as heretofore described.

SUMMARY OF THE INVENTION

The present invention is an air cleaning device which comprises a collections device attached to a vehicle antenna. The front opening of the device channels air into a replaceable filter. The filter is made from materials which remove pollutants from air.

The types of problems encountered in the prior art are removing particulate matter from an air stream.

In the prior art, unsuccessful attempts to solve this problem were attempted namely: devices which focus on prevention of pollution but lack any utility in removing the pollutants already in the atmosphere. However, the problem was solved by the present invention because it functions with a scoop to remove particulate matter from the atmosphere.

The present invention went contrary to the teaching of the art which shows major installation to prevent pollution or clean the source of pollutants before they are released into the atmosphere by teaching a scoop and filter which is installed on millions of vehicles, each functioning as an atmospheric filter.

The present invention solved a long felt need to remove particulate matter, particularly matter which contaminates the atmosphere.

Accordingly, it is an object of the present invention to provide each vehicle with a filter that removes some of the vehicles emissions from the atmosphere.

More particularly, it is an object of the present invention to direct an air stream through a filter.

In keeping with these objects, and with others which will become apparent hereinafter, one feature of the present invention resides, briefly stated, in a funnel having a funnel ingress through which polluted air enters and a funnel egress out of which clean air exits.

When the smog scoop is designed in accordance with the present invention, each vehicle becomes an air cleaning filter.

In accordance with another feature of the present invention, a connector removably attaches the funnel to a holder.

Another feature of the present invention is that a holder functions to removably, securely and rotatably attach the connector to a vehicle antenna Yet another feature of the present invention is that a filter is contained in the funnel.

The novel features which are considered characteristic for the invention are set forth in the appended claims. The invention itself however, both as to its construction and its method of operation, together with additional objects and advantages thereof, will be best understood from the following description of the specific embodiments when read and understood in connection with the accompanying drawings.

LIST OF REFERENCE NUMERALS UTILIZED IN THE DRAWINGS

10—smog scoop (10)
12—funnel (12)
12A—funnel ingress (12A)
12B—funnel egress (12B)
12BA—funnel egress stopper (12BA)
12C—funnel middle (12C)
14—connector (14)
14T—top connector (14T)
14B—bottom connector (14B)
16—holder (16)
16A—holder top (16A)
16B—holder bottom (16B)
16BA—holder bottom insert (16BA)
16C—holder middle (16C)
18—filter (18)
20—vehicle (20)
20A—vehicle antenna (20A)

DESCRIPTION OF THE PREFERRED EMBODIMENT

Figure 1:
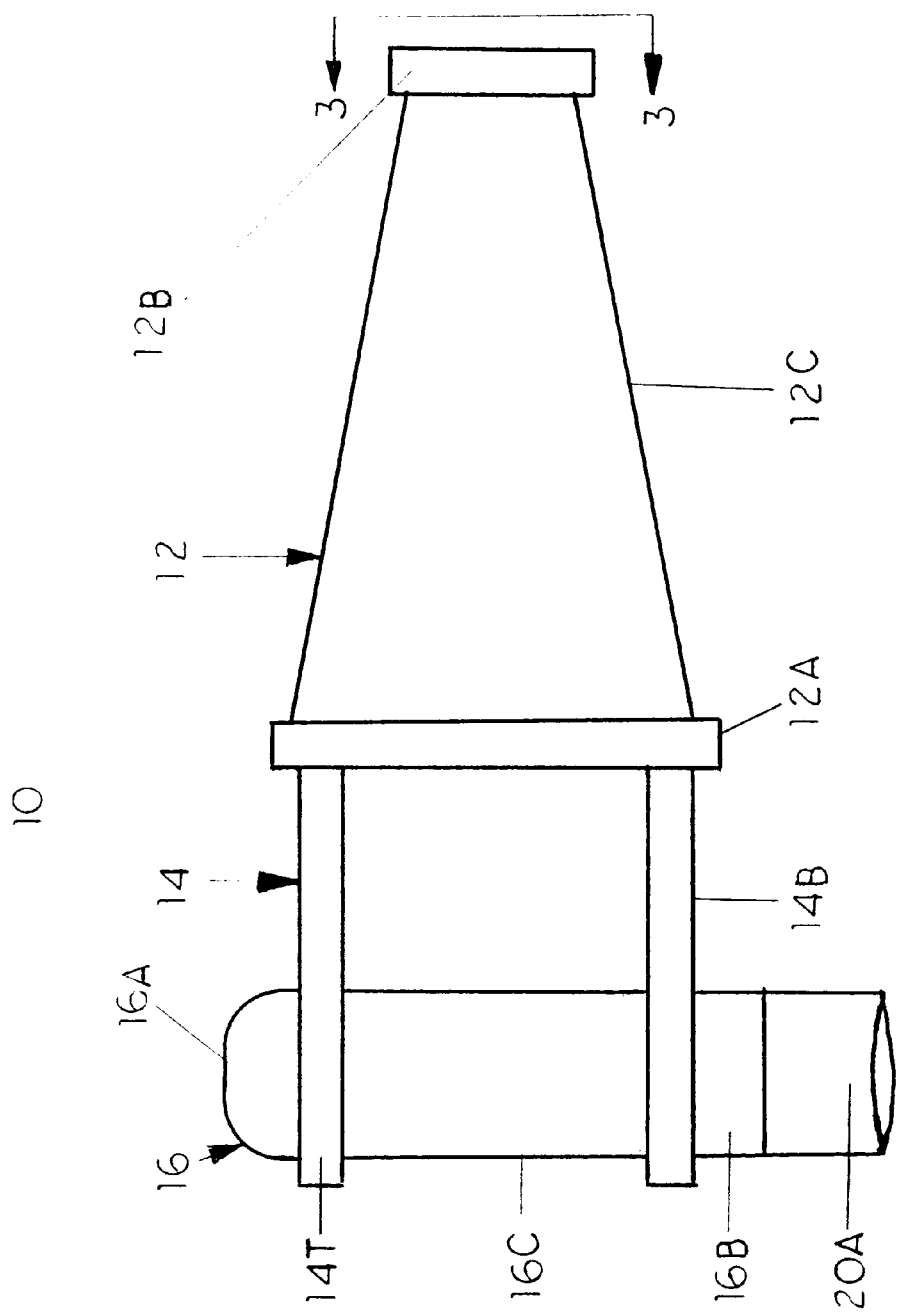
FIG. 1 is a side view of a smog scoop.

Firstly, referring to FIG. 1 which is a side view of a smog scoop (10). The smog scoop (10) comprises a funnel (12) which comprises a large diameter funnel ingress (12A) connected to a small diameter funnel egress (12B) by a tapering funnel middle (12C). The funnel ingress (12A) comprises approximately a $1\ 3/8$ inch diameter. The funnel egress (12B) comprises approximately a $4/10$ inch inner diameter and a ½ inch outer diameter. The funnel ingress (12A) functions to direct an air flow to the tapering funnel middle (12C). The tapering funnel middle (12C) functions to direct and compress the air flow toward the small diameter funnel egress (12B).

The smog scoop (10) further comprises a connector (14) securely attached at an outer distal end to the funnel ingress (12A). The connector (14) comprises a top connector (14T) securely connected at an outer distal end to an upper inner surface of the funnel ingress (12A) and further connected at an inner distal end to a top end of a holder middle (16C) of the holder (16). The connector (14) further comprises a lower connector (14L) securely connected at an outer distal end to a bottom inner surface of the funnel ingress (12A) and further connected at an inner distal end to a lower end of the holder middle (16C) of the holder (16).

The top connector (14T) and the bottom connector (14B) each comprise approximately a $2/10$ inch width and approximately $7/10$ inch separation therebetween. The top connector (14T) and the bottom connector (14B) comprise an approximate length of ½ inches.

The holder (16) is securely attached to an inner distal end of the connector (14). The holder (16) is mounted on a vehicle antenna (20A). The holder (16) comprises a closed holder top (16A). The holder (16) comprises a holder bottom (16B) having a holder bottom insert (16BA) therein which functions to securely hold different diameter vehicle antennas (20A). The holder bottom (16B) comprises at least one slit opening therein. The holder (16) comprises approximately a $4/10$ inch diameter.

The smog scoop (10) is manufactured from a material selected from a group consisting of plastic, plastic composite, metal, metal alloy, fiberglass, epoxy, carbon-graphite, wood, wood composite, rubber and rubber composite.

Figure 2:
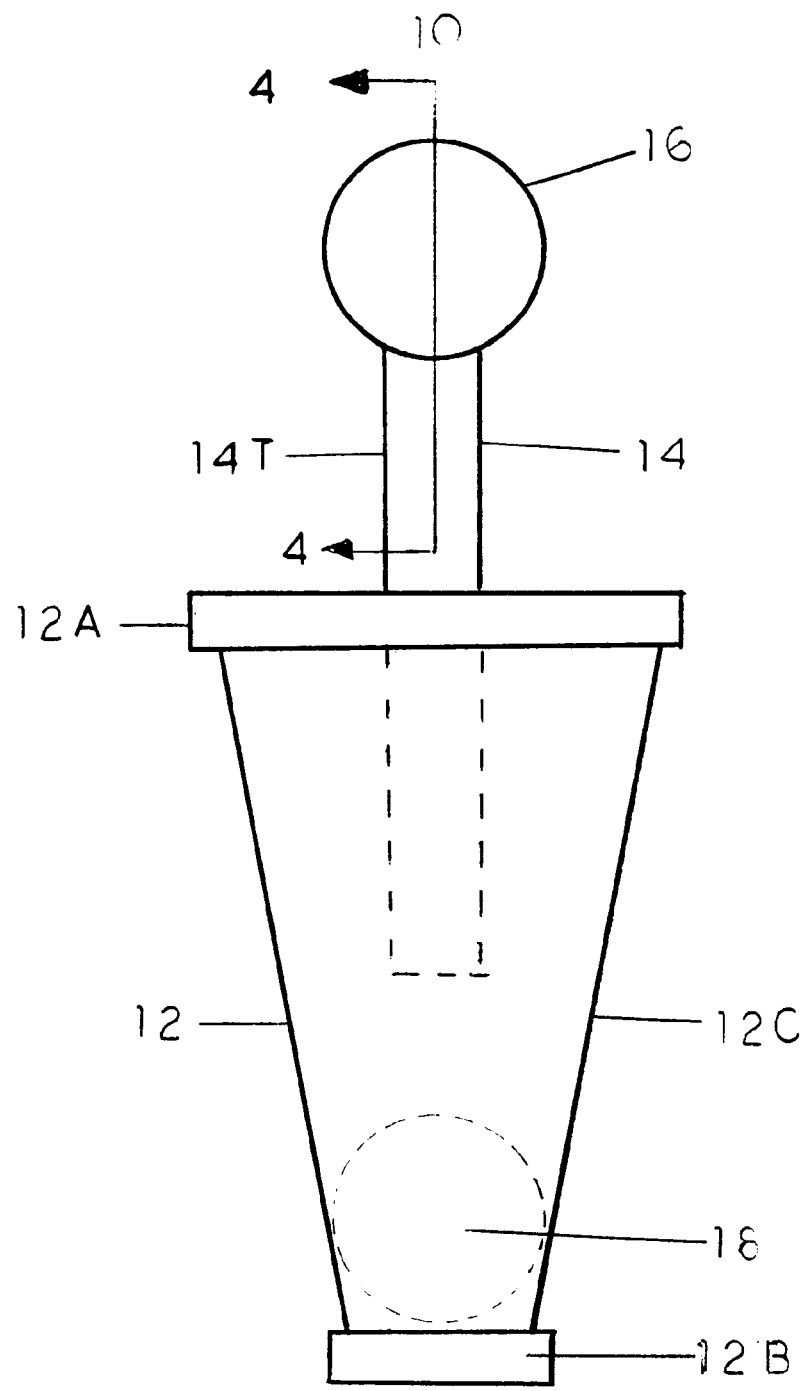
FIG. 2 is a top view smog scoop.

Secondly, referring to FIG. 2 which is a top view smog scoop (10). The smog scoop (10) comprises a funnel (12) which comprises a large diameter funnel ingress (12A) connected to a small diameter funnel egress (12) by a tapering funnel middle (12C).

The smog scoop (10) further comprises a connector (14) securely attached at an outer distal end to the funnel ingress (12A).

The holder (16) is securely attached to an inner distal end of the connector (14). The holder (16) is mounted on a vehicle antenna (20A). The smog scoop (10) still further comprises a disposable filter (18), which is mounted within the funnel (12). The disposable filter (18) is preselected to remove particulate matter from the air.

Figure 3:
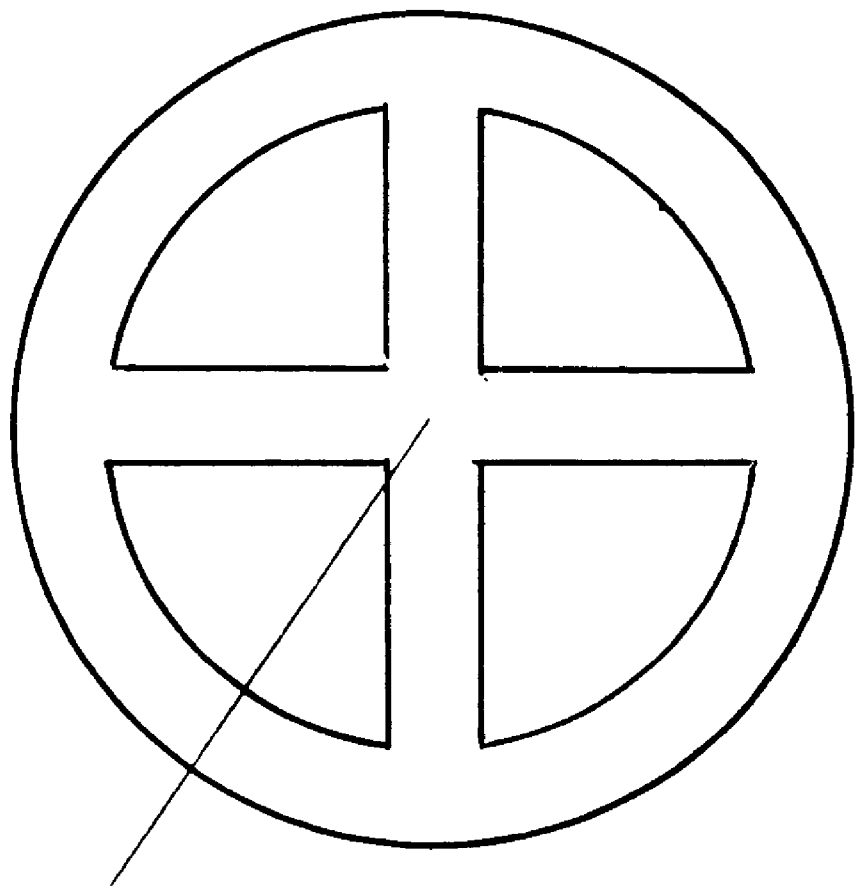
FIG. 3 is a rear view of a funnel egress along line 3—3 of FIG. 3.

Thirdly, referring to FIG. 3 which is a rear view of a funnel egress (12B) along line 3—3 of FIG. 3. The funnel egress (12B) comprises a funnel egress stopper (12BA). The funnel egress stopper (12BA) are perpendicular egress stopper (12BA). The funnel egress stopper (12BA) are perpendicular intersecting cris-cross bars each securely attached on an outer distal end to an inner surface of the funnel egress (12B).

Figure 4:
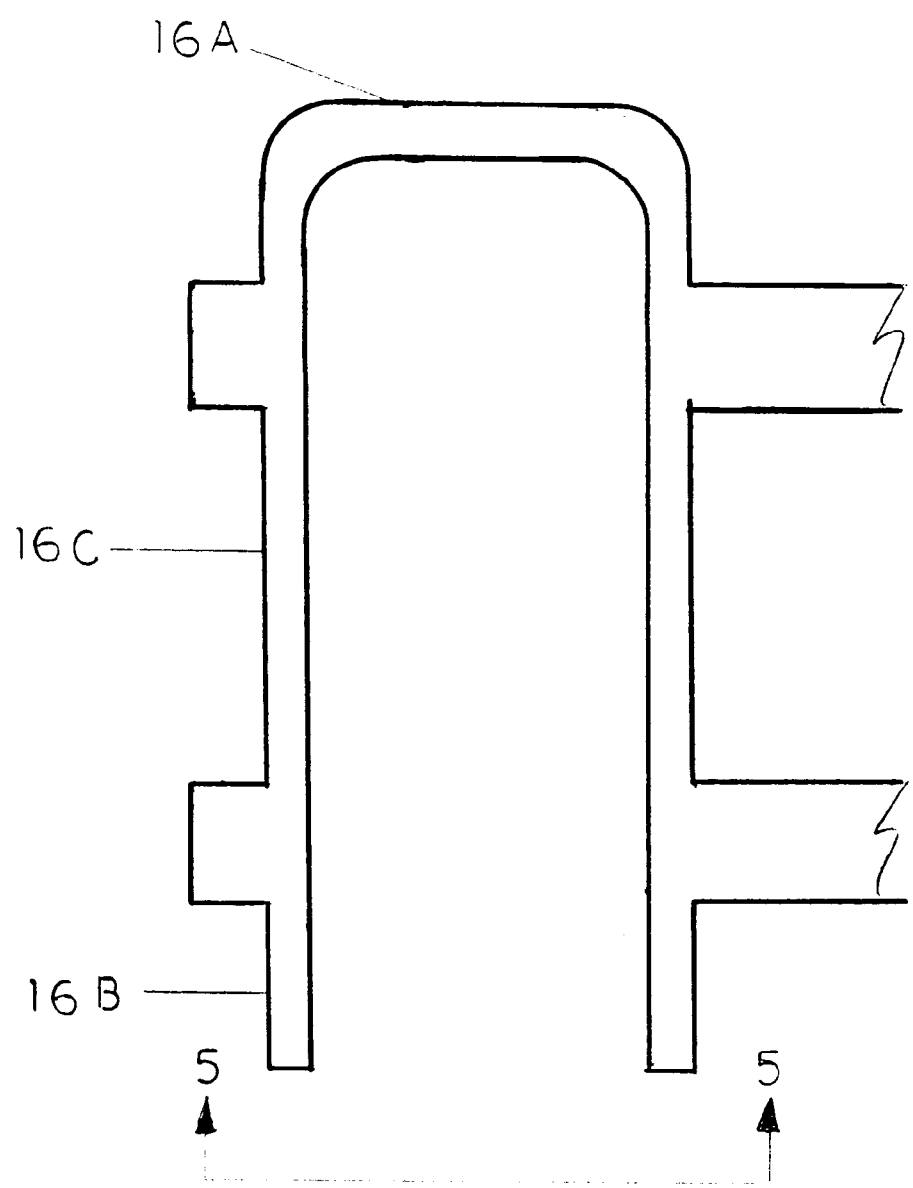
FIG. 4 is a cross-sectional view of a holder along line 4—4 of FIG. 2.

Next referring to FIG. 4 which is a cross-sectional view of a holder (16) along line 4—4 of FIG. 2. The holder (16) comprises a closed holder top (16A). The holder (16) comprises a holder bottom (16B) having at least one slit opening therein.

Figure 5:
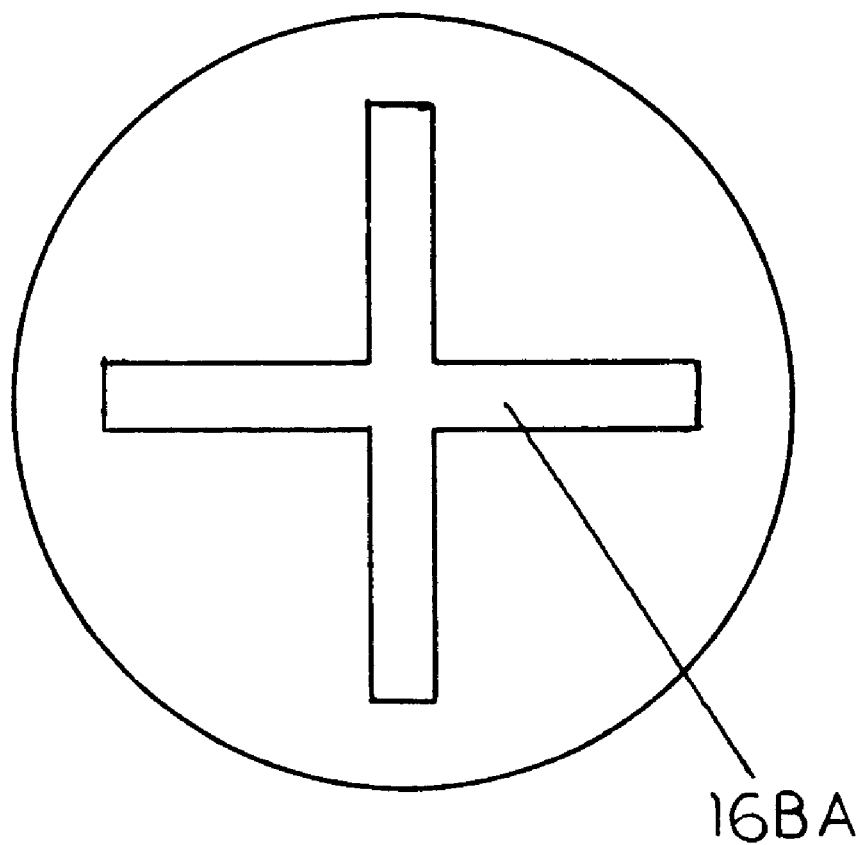
FIG. 5 is a bottom view of a holder along line 5—5 of FIG. 4 exhibiting a holder bottom insert.

Finally, referring to FIG. 5 which is a bottom view of a holder (16) along line 5—5 of FIG. 4 exhibiting a holder bottom insert (16BA). The holder bottom insert (16BA) is manufactured from a resilient material and has at least one slit opening therein which functions to slip over a vehicle antenna (20A) and securely fasten the holder bottom insert (16BA) thereto.

It will be understood that each of the elements described above, or two or more together, may also find an useful application in other types of constructions differing from the type described above.

While the invention has been illustrated and described as embodied in a smog scoop, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A smog scoop (10) comprising:

A) a funnel (12) which comprises a large diameter funnel ingress (12A) connected to a small diameter funnel egress (12B) by a tapering funnel middle (12C);

B) a connector (14) securely attached at an outer distal end to the funnel ingress (12A);

C) a holder (16) securely attached to an inner distal end of the connector (14), the holder (16) is mounted on a vehicle antenna (20A) of a vehicle (20); and D) a disposable particulate filter (18) mounted within the funnel (12) functioning to remove particulates from air.

2. The smog scoop (10) as described in claim 1, wherein the funnel egress (12B) comprises a funnel egress stopper (12BA) functioning to prevent the filter (18) from exiting the funnel egress (12B) during use.

3. The smog scoop (10) as described in claim 2, wherein the funnel egress stopper (12BA) are perpendicular intersecting criss-cross bars each securely attached on an outer distal end to an inner surface of the funnel egress (12B).

4. The smog scoop (10) as described in claim 1, wherein the funnel egress (12B) comprises approximately a 4/10 inch inner diameter and a ½ inch outer diameter.

5. The smog scoop (10) as described in claim 1, wherein the connector (14) comprises a top connector (14T) securely connected at an outer distal end to an upper inner surface of the funnel ingress (12A) and further connected at an inner distal end to a top end of a holder middle (16C) of the holder (16), the connector (14) further comprises a lower connector (14L) securely connected at an outer distal end to a bottom inner surface of the funnel ingress (12A) and further connected at an inner distal end to a lower end of the holder middle (16C) of the holder (16).

6. The smog scoop (10) as described in claim 5, wherein the top connector (14T) and the bottom connector (14B) each comprise approximately a 2/10 inch width and approximately 7/10 inch separation therebetween.

7. The smog scoop (10) as described in claim 5, wherein the top connector (14T) and the bottom connector (14B) comprise an approximately 7/10 inch separation therebetween.

8. The smog scoop (10) as described in claim 5, wherein the top connector (14T) and the bottom connector (14B) comprise an approximate length of ½ inches.

9. The smog scoop (10) as described in claim 1, wherein the holder (16) comprises a closed holder top (16A).

10. The smog scoop (10) as described in claim 1, wherein the holder (16) comprises a holder bottom (16B) having a holder bottom insert (16BA) therein which functions to securely hold different diameter vehicle antennas (20A).

11. The smog scoop (10) as described in claim 10, wherein the holder bottom (16B) comprises at least one slit opening therein.

12. The smog scoop (10) as described in claim 1, wherein the holder (16) comprises approximately a 4/10 inch diameter.

13. The smog scoop (10) as described in claim 1, wherein the funnel ingress (12A) comprises approximately a 1 3/8 inch diameter.

14. The smog scoop (10) as described in claim 1 wherein the components of the smog scoop are manufactured from a material selected from a group consisting of plastic, plastic composite, metal, metal alloy, fiberglass, epoxy, carbon-graphite, wood, wood composite, rubber, rubber composite, canvas and nylon.

* * * * *